March 18, 1941.   J. S. MORGAN, JR   2,235,080
DRAWWORK
Original Filed Dec. 21, 1935   2 Sheets-Sheet 1

Inventor
John S. Morgan Jr.
By Lyon & Lyon
Attorneys

March 18, 1941. J. S. MORGAN, JR 2,235,080
DRAWWORK
Original Filed Dec. 21, 1935  2 Sheets-Sheet 2

Inventor
John S. Morgan Jr
By Lyon & Lyon
Attorneys

Patented Mar. 18, 1941

2,235,080

UNITED STATES PATENT OFFICE 2,235,080

DRAWWORK

John S. Morgan, Jr., Manhattan Beach, Calif., assignor, by mesne assignments, to The National Supply Company, Pittsburgh, Pa., a corporation of Pennsylvania Original application December 21, 1935, Serial No. 55,591, now Patent No. 2,161,075, dated June 6, 1939. Divided and this application May 14, 1937, Serial No. 142,594

5 Claims. (Cl. 254—187)

This invention relates to rotary drawworks applicable for use in connection with drilling equipment as utilized in drilling for water, oil or gas, and more particularly to the type of rotary drawworks employed in connection with the rotary method of drilling. This application is a division of my copending application, Serial No. 55,591, filed December 21, 1935, now Patent No. 2,161,075, dated June 6, 1939, for Drawworks.

It is an object of this invention to provide an improved form of rotary drawworks wherein the drive to the drum mounted upon the drumshaft is had through a transmission drive in such a manner as to eliminate the torque of the drive being imposed upon the drumshaft.

Other objects and advantages of this invention it is believed will be apparent from the hereinafter contained description of the preferred embodiment of my invention as illustrated in the accompanying drawings.

Figure 1:
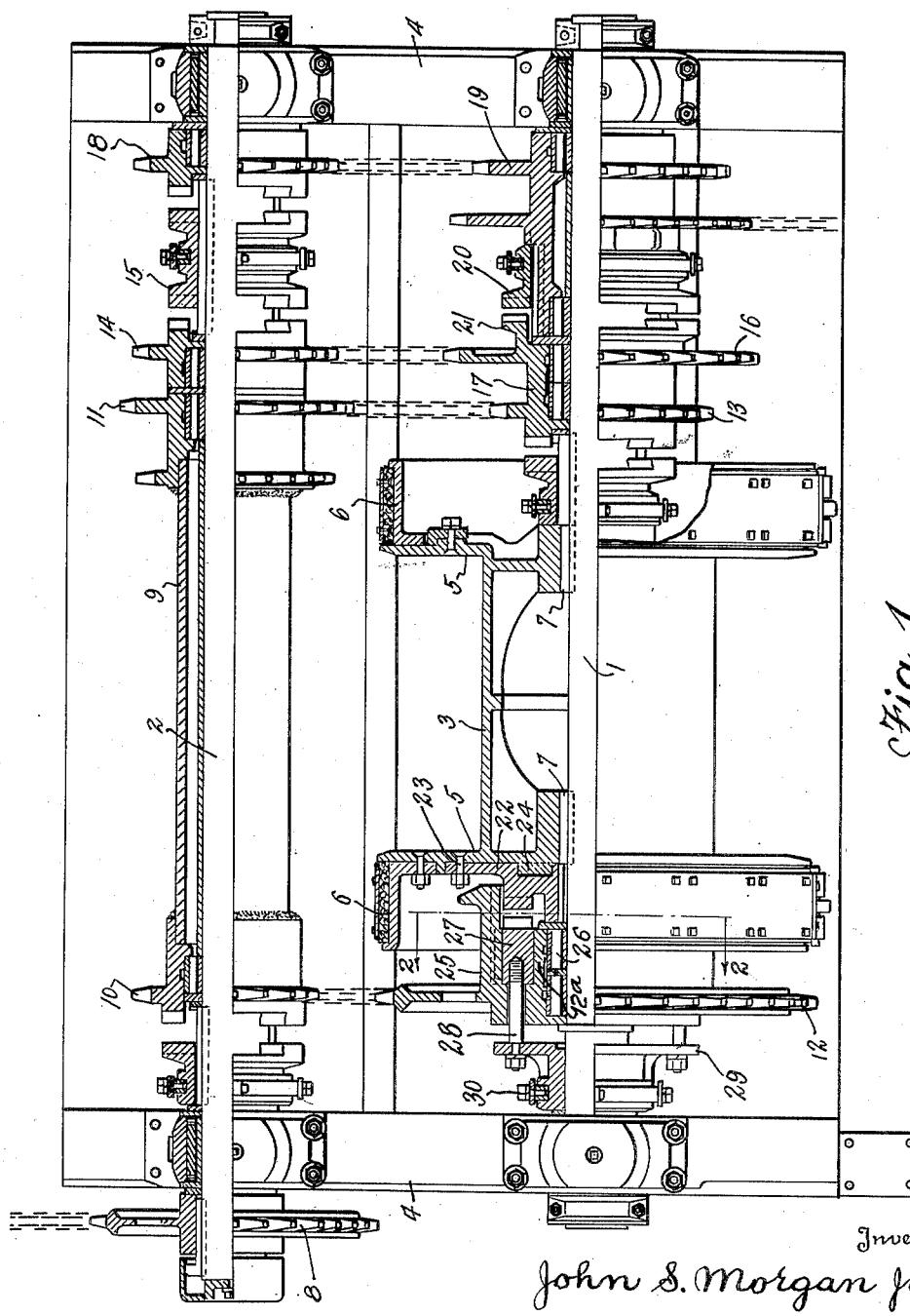
Figure 1 is a top plan view partly in horizontal section of the rotary drawworks embodying my invention.
Figure 2:
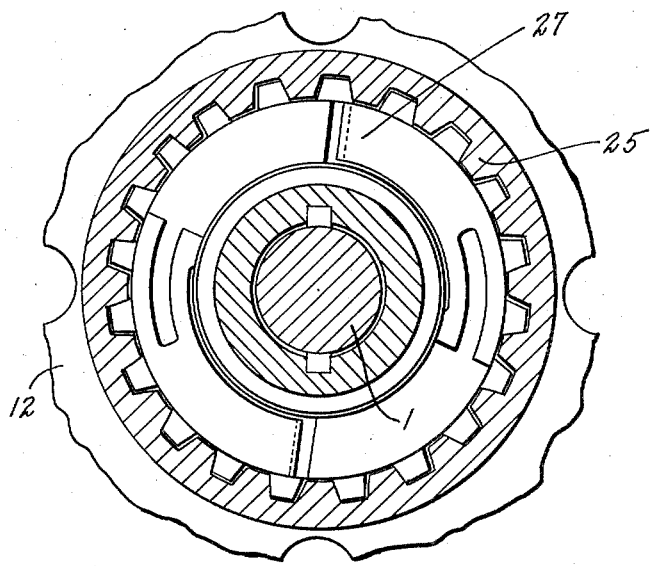
Figure 2 is a sectional end view taken substantially on the line 2—2 of Figure 1.

In the rotary drawworks illustrated in the accompanying drawings 1 indicates a drum shaft and 2 the line or drive shaft. Mounted upon the drum shaft 1 is a drum 3 which may be of any suitable or desirable construction. The shafts 1 and 2 are supported upon end frames 4 in a particular manner which will be apparent from my copending application, Serial No. 55,591, now Patent No. 2,161,075, dated June 6, 1939, for Drawworks. The drum 3 is provided with flanges 5 to which brake rims 6 are secured. The drum 3 is secured to the shaft 1 by means of keys 7. Drive shaft 2 is driven from any suitable or desirable source of power by means of a sprocket 8 secured to the shaft 2.

In order to obtain the particular multiple speed transmission which forms the subject matter of my copending application above referred to, a sleeve 9 is rotatably mounted upon the shaft 2 and is provided with drive sprockets 10 and 11 which are connected by transmission chains with corresponding sprockets 12 and 13 mounted upon the drum shaft 1. A drive sprocket 14 is journaled on the shaft 2 and is adapted to be releasably clutched thereto through the medium of a double clutch 15. The drive from the sprocket 14 is through a chain to an intermediate speed sprocket 16 which is integrally formed with a sleeve 17 of the sprocket 13. Means are provided for driving the customary rotary machine from the drive shaft 2, which means includes a sprocket 18 which is journaled upon the shaft 2 adapted to be releasably engaged therewith through the medium of the double clutch 15. A chain connects the sprocket 18 with the double rotary drive sprocket 19 which is journaled upon the drum shaft 1.

A clutch 20 is splined upon the sleeve of the double sprocket 19 to be engaged with the clutch ring 21 formed integrally upon the end of the sleeve 17 to permit of the drive as fully set forth in my copending application above referred to. The low speed drive from the drive shaft 2 to the drum shaft 1 is of course the drive through which the greatest torque is transmitted as the low speed is ordinarily used where the greatest load is encountered. For this reason I have illustrated the particular drive embodying my present invention as adapted particularly with the low speed drive. However, it is obvious that this form of drive may likewise be incorporated in connection with the other drives to the drum 3 if occasion demands.

In order to eliminate the torque occasioned by the drive from the drive shaft 2 to the drum 3 being transmitted through the drum shaft 1, I prefer to form this transmission drive as follows: Secured to the end flange 5 of the drum 3 is a removable clutch ring 22 which is secured in position by means of bolts 23 and is provided with drive keys 24. The sprocket 12 is formed with an axially extending outer sleeve 25 and inner sleeve 12ª and is journaled upon the shaft 1 on bearings 26. The inner sleeve 12ª is fixed upon the shaft 1 against longitudinal movement. Slidably mounted upon the inner sleeve 12ª is an annular clutch ring 27 which is splined to the sleeve 25. The clutch ring 27 is secured by means of studs 28 to a clutch shifter collar 29 slidably mounted upon the shaft 1 between the sprocket 12 and end frame 4. A shifter fork 30 is provided for the clutch collar 29 to enable the clutch collar 29 to be shifted axially of the shaft 1 to thereby move the clutch ring 27 into or out of engagement with the clutch faces of the clutch ring 22. By this construction the torque transmitted from the drive shaft 2 in driving the drum 3 is transmitted directly to the drum 3 and not through the drum shaft 1.

Having fully described my invention, it is to be understood that I do not wish to be limited to the details herein set forth, but my invention is of the full scope of the appended claims.

I claim:

1. In a hoisting mechanism, the combination of a shaft, a drum mounted on the shaft, a transmission drive member rotatably mounted on said shaft, said member having an extension aligned axially of the shaft, clutch means for releasably coupling the transmission drive member to the drum, said clutch means including a clutch ring positioned within said extension, spline means between the outer diameter of the clutch ring and the inner diameter of said extension, means independent of said spline means adapted to slidably support said clutch ring, the drum having an end flange, a complementary clutch ring on said end flange, means including a shifter collar mounted on the shaft to shift the first named clutch ring into driving engagement with the complementary clutch ring, the transmission drive member being interposed between said shifter collar and said end flange.

2. In a rotary drawworks, the combination of a shaft, a hoisting drum mounted on the shaft, a transmission drive member rotatably mounted on said shaft, inner and outer annular extensions formed concentrically on said transmission drive member, a clutch ring supported by the inner extension, means including cooperating splines on said clutch ring and the outer extension adapted to form a driving connection between the transmission drive member and the clutch ring, a clutch member associated with said drum, and means to shift the clutch ring into driving engagement with the said clutch member.

3. In a rotary drawworks, the combination of a shaft, a hoisting drum mounted on the shaft, a transmission drive member rotatably mounted on said shaft, inner and outer annular extensions formed concentrically on said transmission drive member and cooperating to form an annular recess, a clutch ring having a portion thereof disposed within said annular recess, said clutch ring being supported by the inner extension and forming a spline driving connection with the outer extension, clutch jaws on said drum, and means to shift said clutch ring into driving engagement with the clutch jaws on the drum.

4. In a hoisting mechanism, the combination of a shaft, a hoisting drum mounted on the shaft, a transmission drive member rotatably mounted on said shaft, said member having inner and outer annular extensions formed thereon, a clutch ring slidably supported on the inner extension, complementary spline means formed between the outer extension and the outer periphery of the clutch ring, a clutch ring in driving relation with said drum, and means to shift said first clutch ring into driving engagement with the second named clutch ring.

5. In a hoisting mechanism, the combination of a shaft, a sprocket member and a drum member on said shaft, a sleeve element on one of said members provided with internal spline means extending axially of and encircling a portion of said shaft, axially extending driving jaws on the other of said members, a movable element operatively positioned between the sprocket member and the drum member and adapted to form a releasable driving connection therebetween, said movable element being supported from within its central cylindrical bore for sliding movement axially of the shaft, external spline means on said movable element adapted to slidably and non-rotatably engage within said internal spline means, axially extending driving jaws on one end of said movable element, said jaws having contact faces extending radially of the shaft, and means to shift said movable element axially of the shaft to bring said driving jaws into engagement.

JOHN S. MORGAN, Jr.